Patented June 28, 1932

1,865,398

UNITED STATES PATENT OFFICE

HANS GOLDSCHMIDT, OF BERLIN-GRUNEWALD, AND OSKAR NEUSS, OF BERLIN-CHAR-LOTTENBURG, GERMANY; MRS. MARIE ISOLINA GOLDSCHMIDT, ADMINISTRATRIX OF SAID HANS GOLDSCHMIDT, DECEASED, ASSIGNORS, BY MESNE ASSIGNMENTS, TO SYNTHETIC PLASTICS COMPANY, INCORPORATED, OF NEW YORK, N. Y., A CORPORATION OF DELAWARE

PROCESS FOR MAKING RESINS

No Drawing. Application filed September 30, 1922, Serial No. 591,639, and in Germany June 1, 1921.

Our invention relates to improvements in bodies made from carbamid or its derivatives and formic aldehyde and in the process of manufacturing the same. It is to be understood that the term "carbamid" as used herein, is intended to cover urea whether added as such or in the form of compounds which will readily be converted into urea. More particularly the invention relates to the process in which the said compounds are combined by heat into bodies which have an appearance varying from that of glue to that of clear glass. The object of the improvements is to provide a process which can be carried out within a comparatively short period of time and at low cost, and which yields better products than the process now in use. With this object in view our invention consists in adding to the said compounds condensing media such as small amounts of acids or non-alkaline salts, or bodies such as phenols which form condensation products with formic aldehyde.

We have found that by using acid condensing media the cost of the process is reduced because the amount of formic aldehyde required in the process is reduced. The properties of the bodies obtained by the improved process largely depend upon the amount of the condensing media added to the aforesaid compounds. For example, if small amounts of acid condensing media are used, bodies are obtained which are either clear as glass or dull, according to the proportion of the urea and formic aldehyde, which bodies are ordinarily at first soft and are gradually hardened by subsequent condensation or by giving off water. If larger amounts of acid condensing media are used, and particularly if the relative amount of formic aldehyde is reduced, porous bodies of the character of meerschaum are produced, which are either soft or more or less hard like meerschaum, according to certain details of the manufacture, and which can be worked in any way as by filing, machining, cutting, turning, or rasping, and which can also be impregnated with dissolved dyestuffs, oils, resins, artificial resins, salt solutions, or the like. If instead of the slight amounts of acid such organic bodies of acid character (e. g. phenols, etc.,) are used as condensing media, which by themselves are adapted to condense with the formic aldehyde into artificial resinous bodies, the compounds of condensation of urea and formic aldehyde are in a higher degree waterproof. Finally, if as condensing media organic bodies of acid character such as phenols together with acids are used, the resulting products readily give off their water either by vaporization or under pressure, and they are distinguished by their hardness.

Our invention will be best understood from the following examples:

*Example 1.*—A body which is as clear as glass is obtained when heating 100 grammes of 30% formic aldehyde of the trade and 20 grammes of urea (molar ratio 3:1) together with 0.013 gramme of hydrochloric acid (calculated on the basis of the 100% hydrochloric acid), and distilling off the water formed in the reaction. The product is a body clear as glass of the character of a hard gelatine, which when further heated or left exposed to the air, completely hardened and can be worked by mechanical means (i. e. machined). If the amount of formic aldehyde is reduced dull bodies are obtained. The use of the acid condensing medium results in a saving of from 15 to 17 per cent. of formic aldehyde, and the bodies produced are more rapidly solidified when poured out than bodies produced in a similar way and without condensing media.

*Example 2.*—20 grammes of urea are added to 100 grammes of preheated formic aldehyde of 30% together with 0.002 gramme of phenol. The mixture is boiled in the usual way into a thick mass and poured out, and, if desired, further heated to form a solid mass. The product is a mass which is hardened within a short time. When not adding phenol the mass is dull, so that also in this case formic aldehyde is saved. When adding a larger percentage of phenol, for example from 3 to 5 per cent (based on the urea), the product is much more waterproof.

*Example 3.*—20 grammes of urea are dissolved in 60 grammes of formic aldehyde of 30% and 20 grammes of water, and heated to foaming, whereupon 5 grammes of concentrated sulfuric acid, nitric acid, or hydrochloric acid are added and the product is cast in moulds. As distinguished from the bodies made with smaller amounts of acid, the bodies are dull, and they have the appearance of meerschaum or porcelain. If less formic aldehyde is used the resulting bodies are softer, and if the amount of formic aldehyde is increased, the bodies are harder. The bodies are porous, and they take up about double their weight of water, but they do not swell. The apparent specific gravity of the bodies is, by reason of their porosity, about 0.8035, while the specific gravity of the bodies of the character of the porcelain obtained with little acid or phenol or the like as a condensing medium is above 1.

*Example 4.*—5 parts of phenol, about 100 parts of formic aldehyde of 100%, and 0.096 parts of concentrated sulfuric acid are heated to boiling temperature, whereupon 20 parts of urea are added and the mass is further heated until a thick viscous mass is obtained. When cooling at first a dull body is obtained which readily gives off its water for example when pressed, and then is clear.

*Example 5.*—10 grammes of phenol, 94 grammes of formic aldehyde of 30%, and 0.096 gramme of sulfuric acid are heated to boiling temperature, whereupon 20 grammes of urea are added and the mixture is further heated until a thick viscous mass is obtained. The product is a dull, dense body from which after cooling the water can be removed by pressing. After hardening and final drying, without material changing of the form, a dense body resembling ivory is obtained, which can readily be worked. The body is perfectly waterproof, and it does not soften or swell in any way even when immersed in water for a long time.

Where derivatives of urea are referred to, it is to be understood that such derivatives as contain at least two free (unsubstituted) amino hydrogen atoms, each amino group containing at least one unsubstituted hydrogen atom, can be used. Urea is $$H_2N\text{-}CO\text{-}NH_2.$$

Each $NH_2$ group, in urea itself, contains two unsubstituted hydrogen atoms, one of these hydrogen atoms of either one or both of the $NH_2$ groups can be replaced by another element or a radical (but not both hydrogen atoms of the same $NH_2$ group), and the resulting body is operative in the process. The researches of the applicants indicate the probability of the following intermediate reaction:

$$H_2N\text{-}CO\text{-}NH_2 \text{ minus } H_2O \text{ gives } HN=C=HN$$

or carbon diimide. Attention is called to the fact that in our process we use a relatively small amount of the non-alkaline condensing agent, i. e., the amount of the latter is always only a minor fraction of the amount of urea. The term "a urea material" containing not less than one unsubstituted hydrogen atom to each nitrogen atom is accordingly intended to cover urea itself and such substituted urea compounds as contain at least one unsubstituted hydrogen attached to each of the nitrogen items.

The acid preferably used as the condensing agent, figured as concentrated acid, will be seen from the above to be not below 3% of the weight of carbamid used.

We claim:

1. The herein described process of making artificial resins characterized in that formaldehyde and urea are heated and have added thereto an acid condensation means in addition to the acid normally found in commercial formaldehyde, such acid condensation means being added in sufficient quantities to accelerate appreciably the condensation of the formaldehyde and urea and the quantity of such acid condensation means being small enough that the gel arising upon cooling of the reaction mixture gives, upon subsequent hardening a glass clear homogeneous end product.

2. The herein described process of making artificial resins, which consists in heating formic aldehyde and carbamid together with an organic condensing medium of acid character in addition to the acid normally found in commercial formaldehyde to such an extent that after cooling a solid mass is obtained, the amount of such acid being equivalent to less than 12% of HCl gas, based on the carbamid.

3. The herein described process of making artificial resins which consists in heating formic aldehyde and carbamid together with an organic body of acid character which is capable of forming condensation products of resinous character with the formic aldehyde.

4. The herein described process of making artificial resins, which consists in heating formic aldehyde and carbamid together with a mixture of an acid material and an organic body of acid character, which organic body itself is capable of reacting with the formic aldehyde to form a condensation product.

5. The herein described process of making artificial resins, which consists in mixing a solution of formic aldehyde with a small percentage of a condensing medium of acid character in addition to the acid normally found in commercial formaldehyde, heating the mixture to boiling temperature, adding urea thereto, and heating the same so far that upon cooling it is solid.

6. A process which comprises reacting upon carbamid with formaldehyde in the presence of an amount of a phenolic body which is a fraction only of the amount of such carbamid.

7. A process which comprises reacting upon one part of urea with about 1.5 parts of actual formaldehyde in the presence of water and in the presence of an acid condensing medium.

8. A process which comprises reacting upon one part of urea with about 1.5 parts of actual formaldehyde, in the presence of water and in the presence of a phenolic body capable of acting as a condensing agent and capable of itself reacting with formaldehyde.

9. A process which comprises reacting on a urea with formaldehyde in the proportion of about 1:3 mols, with a fraction of a percent of an acid.

10. A process which comprises reacting on a urea with formaldehyde in the proportion of about 1:3 mols, together with an amount of an acid equivalent in acidity to a fraction of a percent of actual HCl.

11. A process which comprises reacting on a urea with formaldehyde in the proportion of about 1:3 mols, together with a phenolic body capable of acting as a condensing agent, and itself capable of forming a resin by condensation with formaldehyde.

12. The herein described process of making artificial resins, which consists in mixing a solution of formic aldehyde with a condensing medium of acid character in addition to the acid normally found in commercial formaldehyde, heating the mixture to boiling temperature, adding urea thereto, and heating the same so far that upon cooling it is solid.

13. The herein described resinous product, which is produced by heating formic aldehyde and a urea, together with an acid condensing agent equal in acidity to not more than a few percent of HCl in addition to the acid normally found in commercial formaldehyde.

14. A product as in claim 13, in which the condensing agent is a phenol.

15. A process of making a condensation product which comprises heating together a urea material containing not less than one unsubstituted hydrogen atom attached to each nitrogen atom, with formic aldehyde, in the presence of a much smaller amount of an acidic condensing medium in addition to the acid normally found in commercial formaldehyde.

16. A process of making a condensation product which comprises heating together a urea material containing not less than one unsubstituted hydrogen atom attached to each nitrogen atom, with formic aldehyde, in the presence of a much smaller amount of an acid condensing medium in addition to the acid normally found in commercial formaldehyde.

17. A process of making a condensation product which comprises heating together a urea material containing not less than one unsubstituted hydrogen atom attached to each nitrogen atom, with formic aldehyde, in the presence of a much smaller amount of a phenolic body, the latter serving as an acid condensing medium and also reacting with some of the formaldehyde to produce a condensation product which improves the properties of the urea-formaldehyde condensation product.

18. The herein described process of making artificial bodies which consists in heating formic aldehyde and carbamid together with a small amount of an acid condensing medium in addition to the acid normally found in commercial formaldehyde.

19. The herein described process of making artificial bodies which consists in heating formic aldehyde and carbamid together with an acid material as a condensing medium in addition to the acid normally found in commercial formaldehyde.

20. The herein described process of making artificial bodies, which consists in heating formic aldehyde and carbamid together with organic bodies of acid character which form condensing media with the formic aldehyde in addition to the acid normally found in commercial formaldehyde.

21. A process of making a condensation product which comprises heating together a urea material containing not less than one unsubstituted hydrogen atom attached to each nitrogen atom, with formic aldehyde, in the presence of an acid condensing medium in addition to the acid normally found in commercial formaldehyde.

22. The herein described process of making artificial bodies which consists in heating formaldehyde and carbamid together with an acid in addition to the acid normally found in commercial formaldehyde.

In witness whereof we have hereunto set our hands.

Professor Dr. HANS GOLDSCHMIDT.
OSKAR NEUSS, Chemiker.